US012121816B2

United States Patent
Dong et al.

(10) Patent No.: US 12,121,816 B2
(45) Date of Patent: Oct. 22, 2024

(54) ALLOCATION METHOD AND APPARATUS FOR VIRTUAL REWARD RESOURCES, ELECTRONIC DEVICE, COMPUTER-READABLE STORAGE MEDIUM, AND COMPUTER PROGRAM PRODUCT

(71) Applicant: Tencent Technology (Shenzhen) Company Limited, Shenzhen (CN)

(72) Inventors: Zexian Dong, Shenzhen (CN); Chen Liang, Shenzhen (CN); Yong Gao, Shenzhen (CN); Shenyang Hu, Shenzhen (CN); Yongliang Huang, Shenzhen (CN); Meng Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 366 days.

(21) Appl. No.: 17/741,290

(22) Filed: May 10, 2022

(65) Prior Publication Data

US 2022/0370917 A1 Nov. 24, 2022

Related U.S. Application Data

(63) Continuation of application No. PCT/CN2021/124342, filed on Oct. 18, 2021.

(30) Foreign Application Priority Data

May 20, 2021 (CN) .......................... 202110554403.0

(51) Int. Cl.
*A63F 13/69* (2014.01)
*A63F 13/46* (2014.01)
(Continued)

(52) U.S. Cl.
CPC .............. *A63F 13/69* (2014.09); *A63F 13/46* (2014.09); *A63F 13/55* (2014.09); *A63F 13/80* (2014.09); *A63F 13/85* (2014.09); *A63F 2300/80* (2013.01)

(58) Field of Classification Search
CPC .......... A63F 13/69; A63F 13/46; A63F 13/55; A63F 13/80; A63F 13/85; A63F 2300/80
(Continued)

(56) References Cited

U.S. PATENT DOCUMENTS 9,566,525 B2 *   2/2017   Suzuki .................. A63F 13/792
2009/0253475 A1  10/2009  Thompson et al.
(Continued)

FOREIGN PATENT DOCUMENTS

CN    105871938 A    8/2016
CN    110935174 A    3/2020
(Continued)

OTHER PUBLICATIONS

Tencent Technology, Japanese Office Action, JP Patent Application No. 2022-560967, May 13, 2024, 4 pgs.
(Continued)

*Primary Examiner* — Allen Chan
(74) *Attorney, Agent, or Firm* — Morgan, Lewis & Bockius LLP

(57) ABSTRACT

A method for allocating virtual reward resources performed by an electronic device are provided. The method includes: obtaining behavior information of each virtual character in a target camp during a teamfight of a game, the target camp including at least one virtual character, the behavior information being a behavior applied by each virtual character in the target camp to a virtual object, and the virtual object being a virtual character in at least one of the target camp or an enemy camp; determining, according to the behavior (Continued)

information, contribution information achieved by each virtual character in the target camp during the teamfight; determining, according to the contribution information, a target virtual character and a target virtual reward resource corresponding to the target virtual character from at least one virtual character included in the target camp; and updating attribute information of the target virtual character according to the target virtual reward resource.

17 Claims, 8 Drawing Sheets

(51) Int. Cl.
  *A63F 13/55* (2014.01)
  *A63F 13/80* (2014.01)
  *A63F 13/85* (2014.01)
(58) Field of Classification Search
  USPC .......................................................... 463/31
  See application file for complete search history.

(56) References Cited

U.S. PATENT DOCUMENTS

| 2011/0230258 | A1 |  | 9/2011 | Van Luchene |
| 2013/0288762 | A1* | 10/2013 | Yoshie | ................... A63F 13/25 |
| | | | | 463/8 |
| 2014/0213356 | A1* | 7/2014 | Iwano | ................. A63F 13/332 |
| | | | | 463/31 |
| 2017/0337776 | A1* | 11/2017 | Herring | ................... A63F 13/79 |
| 2019/0091577 | A1* | 3/2019 | Reiche, III | ............ A63F 13/795 |
| 2021/0060438 | A1 |  | 3/2021 | Oe et al. |

FOREIGN PATENT DOCUMENTS

| CN | 112337089 | A | 2/2021 |
| CN | 111346375 | A | 6/2021 |
| CN | 113134237 | A | 7/2021 |
| JP | 2015002953 | A | 1/2015 |
| JP | 2017000237 | A | 1/2017 |
| JP | 2017056074 | A | 3/2017 |
| JP | 2017064251 | A | 4/2017 |
| JP | 2018000513 | A | 1/2018 |
| JP | 2018126358 | A | 8/2018 |
| JP | 2020054505 | A | 4/2020 |
| JP | 2020062315 | A | 4/2020 |
| TW | 201821139 | A | 6/2018 |

OTHER PUBLICATIONS

Tencent Technology, WO, PCT/CN2021/124342, Feb. 18, 2022, 5 pgs.
Tencent Technology, Iprp, PCT/CN2021/124342, Nov. 21, 2023, 6 pgs.
Tencent Technology, Japanese Office Action, JP Patent Application No. 2022-560967, Aug. 28, 2023, 10 pgs.
Tencent Technology, ISR, PCT/CN2021/124342, Feb. 18, 2022, 2 pgs.
Tencent Technology, Japanese Office Action, JP Patent Application No. 2022-560967, Dec. 18, 2023, 10 pgs.
Tencent Technology, Korean Office Action, KR Patent Application No. 10-2022-7016511, May 10, 2024, 24 pgs.

* cited by examiner

ALLOCATION METHOD AND APPARATUS FOR VIRTUAL REWARD RESOURCES, ELECTRONIC DEVICE, COMPUTER-READABLE STORAGE MEDIUM, AND COMPUTER PROGRAM PRODUCT

CROSS-REFERENCE TO RELATED APPLICATIONS

This application is a continuation application of PCT Patent Application No. PCT/CN2021/124342, entitled "A METHOD, APPARATUS, ELECTRONIC DEVICE, COMPUTER-READABLE STORAGE MEDIUM, AND COMPUTER PROGRAM PRODUCT FOR ALLOCATING VIRTUAL REWARD RESOURCES" filed on Oct. 18, 2021, which claims priority to Chinese Patent Application No. 202110554403.0, filed with the State Intellectual Property Office of the People's Republic of China on May 20, 2021, and entitled "VIRTUAL REWARD RESOURCE DISTRIBUTION METHOD AND DEVICE, ELECTRONIC EQUIPMENT AND STORAGE MEDIUM", all of which are incorporated herein by reference in their entirety.

FIELD OF THE TECHNOLOGY

This application relates to the field of computer technologies, and specifically, to an allocation method and apparatus for virtual reward resources, an electronic device, a computer-readable storage medium, and a computer program product.

BACKGROUND OF THE DISCLOSURE

With the rapid development of computer technologies and Internet technologies, there are a large quantity of game application programs on the terminal. For some battle games, teamfights are an important game mode in such games.

In the related art, the rewards for teamfights are usually in a fixed manner, that is, rewards corresponding to the quantity of kills and assists are set. However, this simple reward manner based on quantity cannot reflect the intensity of the teamfight, which may lead to rewards brought by a hastily ended teamfight being greater than rewards brought by an entangled teamfight full with reversal. As a result, the enthusiasm of the game players for participating in the teamfight is affected, and a single battle lasts for a long time, resulting in excessive processing pressure on the server.

SUMMARY

Embodiments of this application relate to an allocation method and apparatus for virtual reward resources, an electronic device, a computer-readable storage medium, and a computer program product, which can save the processing resources of a server and reduce the processing pressure of the server.

An embodiment of this application provides a method for allocating virtual reward resources performed by an electronic device, the method including:
  obtaining behavior information of each virtual character in a target camp during a teamfight of a game, the target camp including at least one virtual character, the behavior information being a behavior applied by each virtual character in the target camp to a virtual object, and the virtual object being a virtual character in at least one of the target camp or an enemy camp of the game;
  determining, according to the behavior information, contribution information achieved by each virtual character in the target camp during the teamfight;
  determining, according to the contribution information, a target virtual character and a target virtual reward resource corresponding to the target virtual character from the at least one virtual character included in the target camp; and
  updating attribute information of the target virtual character according to the target virtual reward resource.

An embodiment of this application provides an electronic device, including a memory, a processor, and a computer program stored on the memory and executable by the processor, the processor, when executing the program, causing the electronic device to implement the method for allocating virtual reward resources provided in the embodiments of this application.

An embodiment of this application provides a non-transitory computer-readable storage medium, storing a computer program, the computer program, when executed by a processor of an electronic device, causing the electronic device to implement the method for allocating virtual reward resources according to the embodiments of this application.

The embodiments of this application include at least the following beneficial effects: behavior information of each virtual character in a target camp during a teamfight is obtained, and contribution information achieved by each virtual character in the target camp during the teamfight is determined according to the behavior information, thereby laying the foundation for subsequently flexibly determining a target virtual character and a target virtual reward resource according to the contribution information. In addition, the target virtual character and the corresponding target virtual reward resource are determined from the target camp according to the contribution information, attribute information of a corresponding target virtual character is updated according to the target virtual reward resource, and the virtual reward resources can be dynamically allocated according to behaviors of the virtual characters in each teamfight. In this way, the players' participation in the teamfight can be improved, thereby reducing the time-consuming of each round of game and reducing the processing pressure of a server.

BRIEF DESCRIPTION OF THE DRAWINGS

To describe the technical solutions in the embodiments of this application more clearly, the following briefly describes the accompanying drawings required for describing the embodiments of this application.

DESCRIPTION OF EMBODIMENTS

Figure 1:
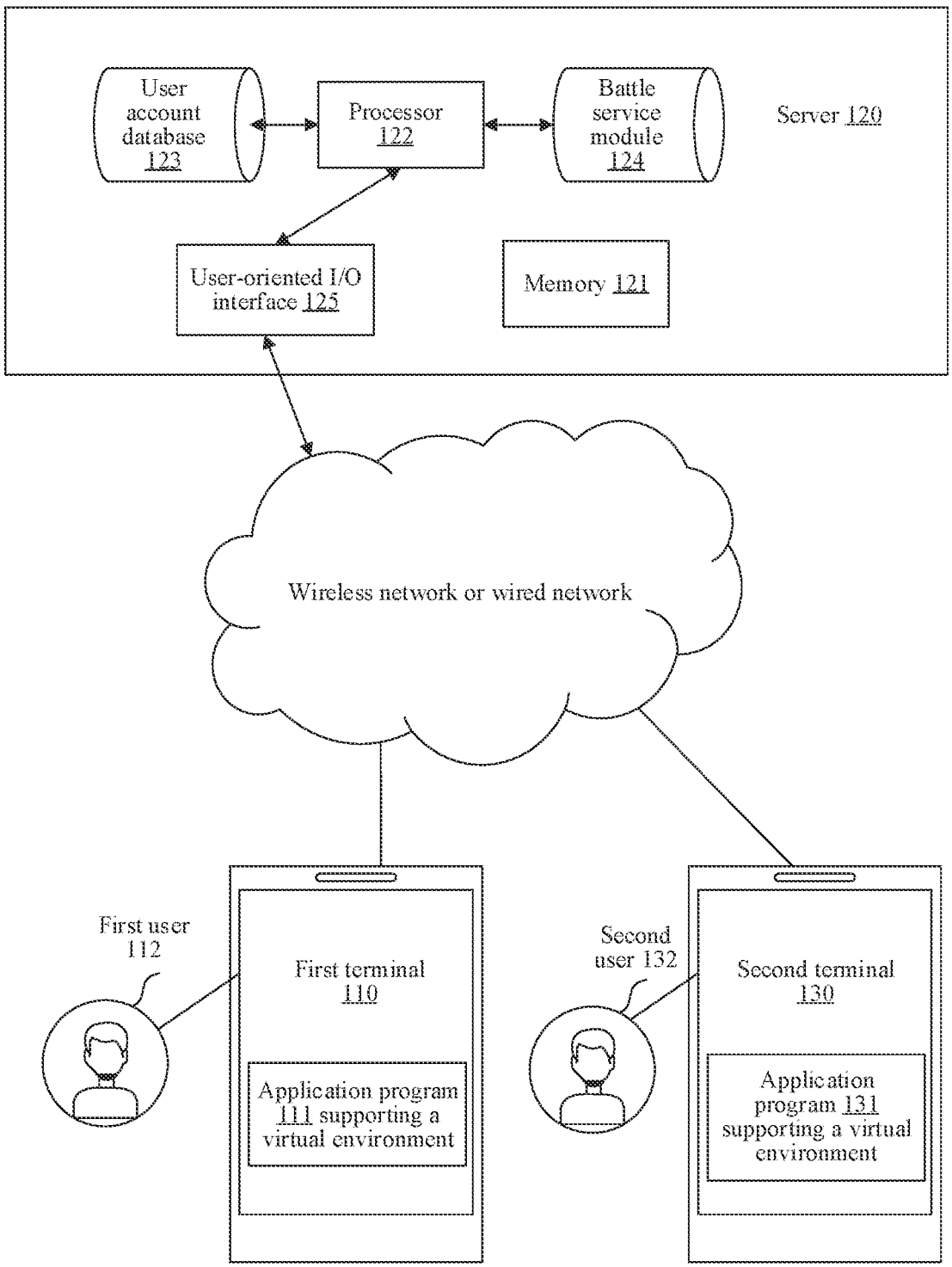
FIG. 1 is a schematic diagram of an implementation environment according to an embodiment of this application.

Embodiments of this application are described in detail below, and examples of the embodiments of this application are shown in accompanying drawings, where the same or similar elements or the elements having same or similar functions are denoted by the same or similar reference numerals throughout the description. The embodiments that are described below with reference to the accompanying drawings are exemplary, and are only used to interpret this application and cannot be construed as a limitation to this application.

A person skilled in the art may understand that, the singular forms "a", "an", and "the" used herein may include the plural forms as well, unless the context clearly indicates otherwise. It is to be further understood that, the terms "include" and/or "comprise" used in this specification of this application refer to the presence of stated features, integers, steps, operations, elements, and/or components, but do not preclude the presence or addition of one or more other features, integers, steps, operations, elements, components, and/or combinations thereof. It is to be understood that, when an element is "connected" or "coupled" to another element, the element may be directly connected to or coupled to another element, or an intermediate element may exist. In addition, the "connection" or "coupling" used herein may include a wireless connection or a wireless coupling. The term "and/or" used herein includes all of or any of units and all combinations of one or more related listed items.

To make objectives, technical solutions, and advantages of this application clearer, the following further describes implementations of this application in detail with reference to the accompanying drawings.

First, several terms included in the embodiments of this application are described and explained.

1. Multiplayer online battle arena (MOBA) game: It is generally necessary to purchase equipment in combat, players are usually divided into two teams, the two teams compete against each other in a scattered game map, and each player controls a selected character through a real-time strategy (RTS) style interface. During the game, at least two virtual characters compete in a single-round battle mode in a virtual environment. The virtual character needs to cause damage to another virtual character and avoid damage launched by another virtual character. In some battle modes (such as 1 Versus (V) 1), when health points of the virtual characters in the virtual environment are zero, the final virtual character that survives in the virtual environment is the winner. In some other battle modes (such as a tower push mode), when health points of the virtual characters in bases of the virtual environment are zero, the final virtual character belonging to the base that is not destroyed in the virtual environment is the winner. In the embodiments of this application, the battle starts with a moment when the first client joins the battle, and ends with a moment when the last client exits the battle. Each client may control one or more virtual characters in the virtual environment. In the embodiments of this application, arena modes of the battle may include a single-player battle mode, a two-player team battle mode, or a multi-player team battle mode. The battle mode is not limited in the embodiments of this application.

2. Player: A layer is referred to as a user in the embodiments of this application. The player may also be referred to as a gamer, which is a term used in the gaming industry and among game participants. Broadly speaking, the player is generally a user who plays games, that is, anyone who participates in a game in any form. In particular, in a role-playing game, players play controllable game roles (virtual characters) in a game world, and control such controllable game roles to complete to the game or customized goals. In addition, some players may further be game leading roles or key roles in a game plot in a role-playing game. That is, players are experiencers, users, evaluators, and consumers of a game. According to differences in personality and preferences, different players prefer different types of games.

3. Virtual character: a movable object in a virtual environment. The movable object may be a virtual person, a virtual monster, or the like, for example, a person, an animal, or a plant displayed in a virtual environment. The virtual character may be a virtual image used for representing a player in the virtual environment. The virtual environment may include a plurality of virtual characters, and each virtual character has a shape and a volume in the virtual environment, and occupies some space in the virtual environment.

In the embodiments of this application, when the virtual environment is a three-dimensional virtual environment, the virtual character may be a three-dimensional model, and the three-dimensional model may be a three-dimensional character constructed based on three-dimensional human skeleton technology. The same virtual character may show different external appearances by wearing different skins. In some embodiments, the virtual character may be alternatively implemented by using a 2.5-dimensional model or a two-dimensional model, which is not limited in the embodiments of this application. In some embodiments, the virtual character may be a player character controlled through an operation on a client, or may be a non-player character (NPC) set in a virtual environment interaction. In the embodiments of this application, the virtual character may be a virtual person competing in a virtual environment.

4. Game battle is an interaction game environment provided by multiplayer battle arena games for users to control virtual objects. In the embodiments of this application, the user may enter a corresponding game battle by selecting a target game mode.

In the embodiments of this application, one or more game modes may be provided to the user in the MOBA games. Different game modes correspond to different playing methods and rules. In the embodiments of this application, when a MOBA game starts, a client displays various game modes corresponding to the MOBA game, and the user can control, by clicking/tapping a corresponding target game mode, the client to display a virtual environment screen corresponding to the target game mode. In the embodiments of this application, the virtual environment screen includes elements such as a virtual building, a virtual prop, and a virtual character in a virtual environment. In addition, some operation controls, such as a button, a slider, and an icon are usually superimposed and displayed on the virtual screen for the user to operate.

5. Killing is also known as elimination or defeat, and regardless of the title used, refers to an operation of reducing a virtual health point of a virtual character to zero. After the virtual health point of the virtual character is reduced to zero, the virtual character is in a death state. Correspondingly, a survival state of the virtual character is a state in which the virtual health point of the virtual character is not zero.

6. Frame synchronization is a process that a server collects operation instructions transmitted by a game client, and then broadcasts the operation instructions to each client at a specific time (after the collection is completed), and the client performs the same logic processing according to the received operation instructions, to finally obtain the same result. In terms of implementation, the server generally collects the operation instructions of each client at a fixed frame rate, and then broadcasts these operations to all clients. Since a time (frame) for each operation instruction to reach all clients is the same, a result operated by each client is the same, that is, the same result is obtained due to the same input.

The embodiments of this application provide an allocation method and apparatus for virtual reward resources, an electronic device, a computer-readable storage medium, and a computer program product, which can reduce the resource consumption of the server during the teamfight.

The following describes the technical solutions provided in the embodiments of this application and the technical problem of how the technical solutions provided in the embodiments of this application can reduce the resource consumption of a server during a teamfight. The embodiments of this application are described herein with reference to the accompanying drawings.

FIG. 1 shows a schematic diagram of an implementation environment according to an embodiment of this application. The implementation environment may include a first terminal 110, a server 120, and a second terminal 130.

An application program 111 supporting a virtual environment is installed and run on the first terminal 110, and the application program 111 may be a multiplayer online battle program. When the first terminal runs the application program 111, a user interface (UI) of the application program 111 is displayed on a screen of the first terminal 110. The application program 111 may be any one of a military simulation program, a MOBA game, an escape shooting game, or a simulation game (SLG). In this embodiment of this application, an example in which the application program 111 is a MOBA game is used for description. The first terminal 110 is a terminal used by a first user 112. The first user 112 uses the first terminal 110 to control a first virtual character located in the virtual environment to perform activities, and the first virtual character may be referred to as a master virtual character of the first user 112. The activities of the first virtual character include, but are not limited to at least one of picking, shooting, attacking, throwing, casting skills, displacement, purchasing equipment, or healing. For example, the first virtual character is a first virtual person such as a simulated person or a cartoon figure.

An application program 131 supporting a virtual environment is installed and run on the second terminal 130, and the application program 131 may be a multiplayer online battle program. When the second terminal 130 runs the application program 131, a UI of the application program 131 is displayed on a screen of the second terminal 130. The application program 131 may be any one of a military simulation program, a MOBA game, an escape shooting game, or an SLG. In this embodiment of this application, an example in which the application program 131 is a MOBA game is used for description. The second terminal 130 is a terminal used by a second user 132. The second user 132 uses the second terminal 130 to control a second virtual character located in the virtual environment to perform activities, and the second virtual character may be referred to as a master virtual character of the second user 132. For example, the second virtual character is a second virtual person such as a simulated person or a cartoon figure.

In this embodiment of this application, the first virtual character and the second virtual character are in the same virtual world. In some embodiments, the first virtual character and the second virtual character may belong to the same camp, the same team, or the same organization, have a friend relationship, or have a temporary communication permission. In some embodiments, the first virtual character and the second virtual character may belong to different sides, different teams or different organizations or have a hostile relationship with each other.

In this embodiment of this application, the application programs installed on the first terminal 110 and the second terminal 130 are the same, or the application programs installed on the two terminals are the same type of application programs in different operating system platforms (Android system or iOS system). The first terminal 110 may generally refer to one of a plurality of terminals, and the second terminal 130 may generally refer to another one of a plurality of terminals. In this embodiment of this application, the first terminal 110 and the second terminal 130 are used as an example for description. Terminal types of the first terminal 110 and the second terminal 130 are the same or different. The terminal type includes at least one of a smartphone, a tablet computer, an ebook reader, a moving picture experts group audio layer III (MP3) player, a moving picture experts group audio layer IV (MP4) player, a laptop computer, or a desktop computer.

Two terminals are shown in FIG. 1. However, a plurality of terminals may access the server 120. In this embodiment of this application, one or more terminals are terminals corresponding to a developer. A platform for developing and editing the application program supporting the virtual environment is installed on the terminal. The developer can edit and update the application program on the terminal and transmit an updated application program package to the server 120 through a wired or wireless network. The first terminal 110 and the second terminal 130 can download the application program package from the server 120 to update the application program.

The first terminal 110, the second terminal 130, and another terminal are connected to the server 120 through a wireless network or a wired network.

The server 120 includes at least one of one server, a server cluster including a plurality of servers, a cloud computing platform, or a virtualization center. The server 120 is configured to provide a backend service for an application program supporting a three-dimensional virtual environment. In this embodiment of this application, the server 120 is responsible for primary computing work, and the terminal is responsible for secondary computing work; or the server 120 is responsible for secondary computing work, and the terminal is responsible for primary computing work; or a distributed computing architecture is adopted between the server 120 and the terminal to perform collaborative computing.

Exemplarily, the server 120 includes a memory 121, a processor 122, a user account database 123, a battle service module 124, and a user-oriented input/output (I/O) interface

125. The processor 122 is configured to load instructions stored in the server 120, and process data in the user account database 123 and the battle service module 124. The user account database 123 is configured to store data of user accounts used by the first terminal 110, the second terminal 130, and the another terminal, for example, avatars of the user accounts, nicknames of the user accounts, battle effectiveness indexes of the user accounts, and service zones of the user accounts. The battle service module 124 is configured to provide a plurality of battle rooms for the users to battle, for example, a 1V1 battle room, a 3V3 battle room, a 5V5 battle room, and the like. The user-oriented I/O interface 125 is configured to establish communication between the first terminal 110 and/or the second terminal 130 by using a wireless network or a wired network for data exchange.

Figure 2:
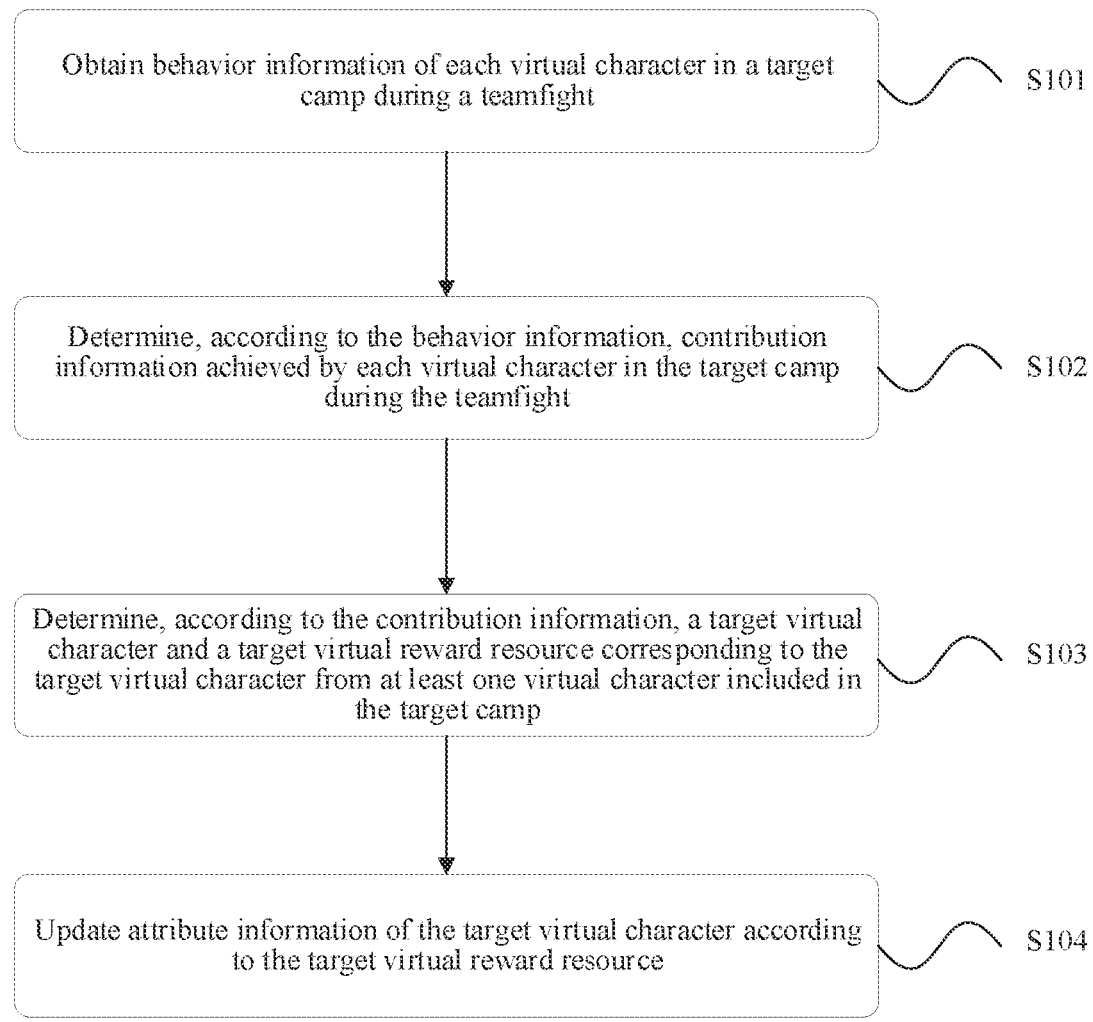
FIG. 2 is a schematic flowchart of an allocation method for virtual reward resources according to an embodiment of this application.

FIG. 2 is a schematic flowchart of an allocation method for virtual reward resources according to an embodiment of this application. The allocation method for virtual reward resources is performed by an electronic device for allocation of virtual reward resources, and the description is made below with reference to steps shown in FIG. 2.

S101. Obtain behavior information of each virtual character in a target camp during a teamfight of a game.

A game battle includes a plurality of camps, the plurality of camps include a camp including virtual characters (also referred to as player characters) controlled by the players and may further include a neutral camp including NPCs. Each camp includes at least one virtual character, and each virtual character may attack the virtual character of another camp. A target camp in this embodiment of this application may be any camp in the game battle, or may be a camp of the virtual character controlled by the player, which is not limited in the embodiments of this application.

Relationships between different virtual characters may be divided into a teammate relationship, a hostile relationship, and a neutral relationship, and the hostile relationship is a relationship between virtual characters that are in two different camps and that are controlled by players. For a virtual character, a camp of another virtual character having a hostile relationship with the virtual character is the enemy camp. For example, there are 10 players participating in an attack event, and the 10 players may form a plurality of different camps. If each camp may include 5 players, for a specific camp, the virtual characters controlled by the 5 players in the camp have a hostile relationship with the virtual characters controlled by the players in another camp. Conversely, the virtual characters controlled by the 5 players in the camp are in a teammate relationship, the virtual characters controlled by the players may attack the virtual characters that are not from the same camp, and the virtual characters that are not from the same camp may include NPCs in a neutral relationship.

The teamfight is that a plurality of virtual objects using a camp as a unit to compete collectively in a game battle. For example, several virtual characters in a camp attack several virtual characters in another camp. In this case, the attack event may be a teamfight event, referred to as a teamfight.

Figure 3:
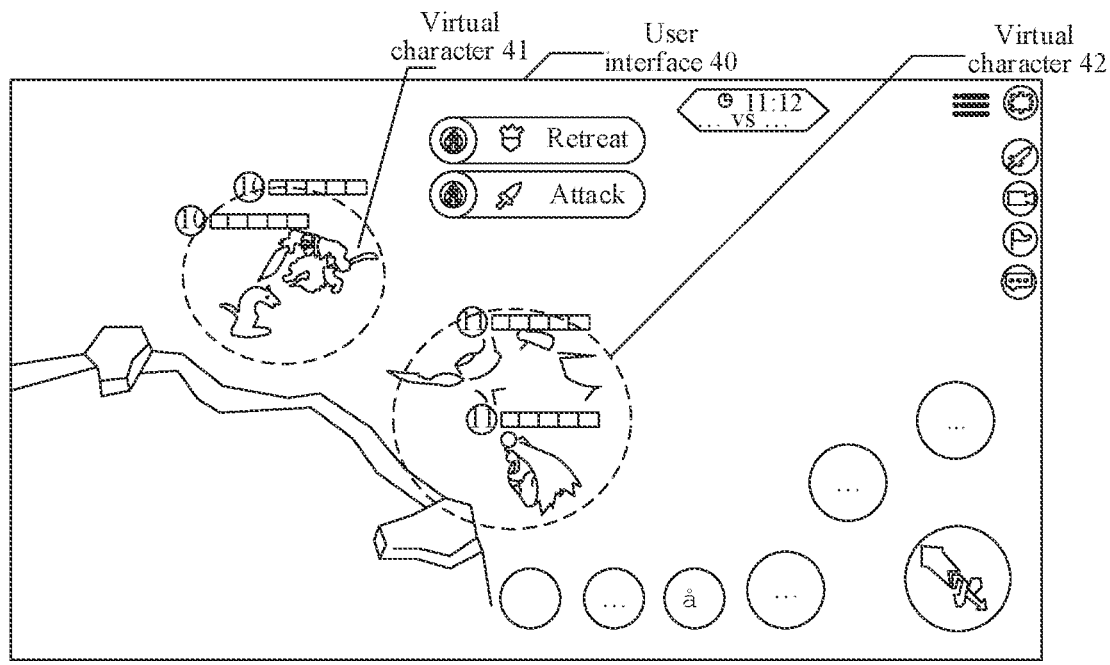
FIG. 3 is a schematic diagram of a teamfight according to an embodiment of this application.

FIG. 3 is a schematic exemplary diagram of a teamfight. As shown in FIG. 3, a virtual scene displayed on a UI 40 of a game application program includes virtual characters of two camps, such as a virtual character 41 of a first camp and a virtual character 42 of a second camp. In this case, the movement states of the virtual characters of the two camps both face the opposing camp, and the virtual characters belonging to one camp are relatively concentrated and approaching. The virtual characters all hold virtual weapons, and gradually approach the virtual characters of the opposing camp in a fighting posture.

This embodiment of this application does not limit the quantity of virtual characters involved in the teamfight, which may include 1VN (one of the two camps participating in the teamfight has only one virtual character) and NVN (each of the two camps participating in the teamfight has a plurality of virtual characters).

In this embodiment of this application, a duration of a teamfight may be determined in the following manner.

S201. Determine, within a preset time interval (for example, 3 seconds) and when there are at least two virtual characters in one camp that launch a plurality of times of attack behaviors against at least one virtual character in another camp, a moment when the earliest attack behavior in the plurality of times of attack behaviors occurs as a start moment of the teamfight.

S202. Determine participants of the teamfight in real time after the start of the teamfight, the participants including a direct participant and an indirect participant, where the direct participant is a virtual character who launches and endures attack behaviors since the start moment of the teamfight, and the indirect participant is another virtual character within a preset distance from the direct participant.

S203. Determine a moment that a duration in which the virtual characters who belong to different camps in the participants in the teamfight do not launch attack behaviors exceeds the preset time and that a distance exceeds the preset distance as an end moment of the teamfight.

The behavior information of this embodiment of this application may include behaviors such as a healing behavior and a damage-receiving behavior performed by a virtual character on other virtual characters in the same camp. The healing behavior is a behavior that a virtual character restores and locks a blood volume of another virtual character of the same camp. Restoring the blood volume is to update the blood volume from a lower blood volume to a higher blood volume, and locking the blood volume is to lock a value of the blood volume at a fixed value within a specific period of time.

The behavior information may further include behaviors such as an attack behavior, a killing behavior, and a control behavior performed by a virtual character on a virtual character from a different camp. The attack behavior is a behavior that a virtual character reduces a blood volume or another state (such as a mana value, the virtual character needs to casts skills by consuming this value) of a virtual character from a different camp. The killing behavior is that a virtual character reduces a blood volume of a virtual character from a different camp to 0, so that the virtual character from the different camp is in a death state. The control behavior is that a virtual character restricts a movement speed and behavior of a virtual character from a different camp, so that the virtual character from the different camp is in a limited state, the movement speed of the virtual character in the limited state is reduced, and the virtual character in the limited state cannot casts skills and attacks other virtual characters.

That is, the behavior information in this embodiment of this application is a behavior applied by each virtual character in the target camp to a virtual object, and the virtual object is a virtual character in at least one of the target camp or the enemy camp. In addition, the quantity of virtual objects included in the virtual objects may be one or more.

The behavior information in this embodiment of this application includes a unique identifier of a behavior applying party, a unique identifier of a behavior receiving party, a specific behavior, and the like. Table 1 exemplarily shows the behavior information of this embodiment of this application. Table 1 is generated by recording each piece of behavior information in a game battle according to a time when a behavior occurred.

TABLE 1

| Occurrence time | Action applying party | Behavior receiving party | Specific behavior |
|---|---|---|---|
| 00:10:12 | sdhfjk001 | qwri23 | Normal attack: 24 |
| 00:11:31 | sdhfjk001 | qwri23 | Skill 1: 74 |
| 00:11:35 | sdhfjk001 | Lko4i, qwri23 | Skill 2: 55 |

Table 1 shows behavior information that is in the 10th minute and 12 seconds to the 11th minute and 35 seconds during a game and that is of a virtual character whose unique identifier is sdhfjk001 in the target camp. At 10 minutes and 12 seconds, the virtual character applies a normal attack to a virtual character whose unique identifier is qwri23, causing 24 points of damage. Generally, a quantitative result of a blood volume is represented by points, for example, a blood volume of a specific virtual character is 2441, that is, the virtual character has a blood volume of 2441 points. Damage recorded in the behavior information is panel damage. In the game, because each virtual character has a respective defense attribute, and the defense attribute can offset part of the panel damage, when the virtual character receives damage from another virtual character, real damage (that is, actual damage) the virtual character received is calculated by the panel damage and the defense attribute. At 11 minutes and 31 seconds, a virtual character whose unique identifier is sdhfjk001 applies a skill attack corresponding to skill 1 to a virtual character whose unique identifier is qwri23, causing 74 points of damage. The skill attack is to attack through a virtual skill. A virtual character has several virtual skills, and the effects of different virtual skills are different. The biggest difference between the virtual skill and the normal attack is in a cooling time and the consumption of some attributes. The cooling time is a minimum interval between the same virtual skill being used once and the next time the same virtual skill can be used. Some skill attacks can cause area damage, that is, virtual characters within a specific range are damaged. At 11 minutes and 35 seconds, a skill attack corresponding to skill 2 applied by a virtual character whose unique identifier is sdhfjk001 is area damage, causing 55 points of damage to both virtual characters (Lko4i and qwri23) within the range.

S102. Determine, according to the behavior information, contribution information achieved by each virtual character in the target camp during the teamfight.

In this embodiment of this application, after the obtaining behavior information of each virtual character in a target camp during a teamfight, contribution information achieved by the virtual character during the teamfight is determined according to the behavior information. Not all virtual characters in the target camp participate in a teamfight event during the teamfight, and the behavior information of different virtual characters has different effects on virtual characters in the non-target camp during the teamfight. Therefore, in this embodiment of this application, the contribution information is determined according to the behavior information, thereby laying the foundation for subsequently flexibly determining a target virtual character and a target virtual reward resource according to the contribution information, and overcoming the disadvantages of small differences in virtual reward resources, low enthusiasm for participating in teamfights, and long game time and slow rhythm caused by only considering a behavior of a virtual character to determine the virtual reward resources.

S103. Determine a target virtual character and a target virtual reward resource corresponding to the target virtual character from at least one virtual character included in the target camp according to the contribution information.

The contribution information achieved by the virtual characters in the target camp is not the same. Therefore, in this embodiment of this application, the target virtual character is determined from the at least one virtual character in the target camp according to the contribution information of the virtual characters. For example, the target virtual character may be a virtual character that contributes the most in a teamfight, or may be a virtual character that achieves a specific game objective. A corresponding target virtual reward resource may be determined according to the contribution information achieved by the target virtual character. The target virtual reward resource may be a resource that can be consumed in a current game battle, a resource used for purchasing/upgrading equipment of the virtual character, or a resource used for restoring a blood volume of the virtual character and improving a status of the virtual character. For example, damage caused by an original attack to the virtual character is 100, and the damage caused by the attack is 200 through the status improvement. The above 100 and 200 are examples of results after quantifying the damage.

In this embodiment of this application, in addition to a virtual character controlled by a player, the target virtual character may further be an NPC in the target camp. For example, in a MOBA game, soldiers appear at a specific interval, and the soldiers actively attack soldiers in an enemy camp and a virtual character controlled by a player.

S104. Update attribute information of the target virtual character according to the target virtual reward resource.

During a game, the virtual character has various types of attributes, which jointly form the attribute information of the virtual character. For example, in a MOBA game, the virtual character has an attack attribute, a defense attribute, a money attribute, and the like. The attack attribute represents a degree of damage caused by the attack of the virtual character to an enemy virtual character. The defense attribute represents a degree of damage caused by the virtual character when the virtual character is attacked by the enemy virtual character. The money attribute represents the sufficiency of the virtual character to purchase virtual props. A higher money attribute indicates that virtual props with higher virtual value or more virtual props can be purchased. In this embodiment of this application, after the target virtual reward resource is determined, attribute information of a corresponding target virtual character may be updated, to enhance the battle effectiveness of the target virtual character in the game battle.

In the allocation method for virtual reward resources of this embodiment of this application, behavior information of each virtual character in a target camp during a teamfight is obtained, and contribution information achieved by each virtual character in the target camp during the teamfight is determined according to the behavior information, thereby laying the foundation for subsequently flexibly determining a target virtual character and a target virtual reward resource according to the contribution information, and overcoming the disadvantages of small differences in virtual reward resources, low enthusiasm for participating in teamfights, and long game time and slow rhythm caused by only considering a behavior of a virtual character to determine the virtual reward resources. The target virtual character and the corresponding target virtual reward resource are further determined from the target camp according to the contribution information, attribute information of a corresponding target virtual character is updated according to the target virtual reward resource, and the virtual reward resources can be dynamically allocated according to behaviors of the virtual characters in each teamfight, thereby improving players' participation in teamfights, improving the compactness and fun of the game, and relatively reducing the time-consuming of each round of game and reducing the processing pressure of a server. In addition, a degree of matching between the rewards during the teamfight and the interaction processing volume of the server can further be improved.

In this embodiment of this application, after an electronic device determines the target virtual character and the corresponding target virtual reward resource from the target camp, the allocation method for virtual reward resources further includes: displaying the target virtual character and prompt information of the corresponding target virtual reward resource on a game interface of a game client.

Figure 4:
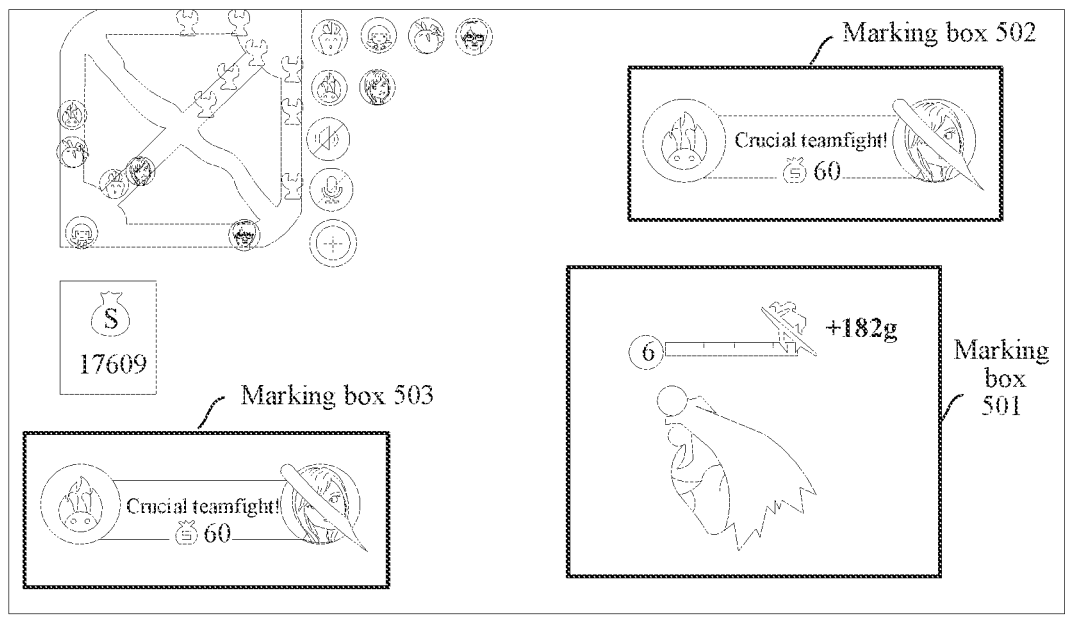
FIG. 4 is a schematic diagram of displaying a target virtual character and prompt information of a corresponding target virtual reward resource on a game interface according to an embodiment of this application.

FIG. 4 is a schematic diagram of displaying a target virtual character and prompt information of a corresponding target virtual reward resource on a game interface according to an embodiment of this application. As shown in FIG. 4, a virtual character marked in a marking box 501 is a target virtual character. It is to be understood that the game interface shown in FIG. 4 is an interface from a perspective of a player of a target virtual character. When different players control corresponding virtual characters, the interface is generally displayed from perspectives of respective players, so as to better control the virtual characters. In FIG. 4, the target virtual character reaches contribution information, that is, a crucial teamfight in a teamfight. To highlight the contribution information in the game interface, prompt information is displayed in an area above the target virtual character in the game interface, including key content of the contribution information and the target virtual reward resource. Referring to a marking box 502, key content of contribution information in the marking box 502 includes avatar information of the target virtual character and avatar information of a virtual object of an enemy camp killed by the target virtual character. The target virtual reward resource is gold coins. It may be seen from FIG. 4 that a specific amount of gold coins is 60 gold coins, and the gold coins can be used to purchase virtual equipment. Prompt information is also displayed in lower left corner of FIG. 4. Referring to a marking box 503, a difference between the prompt information in the marking box 503 and the prompt information in the marking box 502 is only in a display ratio. The reason why the prompt information is also displayed in the lower left corner of the game interface is because the lower left corner of the game interface is a display area of battle information, which generally displays battle information sent by other players in the same camp. The battle information may be voice information or text information entered by other players, and may also include information, such as a duration of the game and the killing of monsters in a neutral camp, generated by the server according to the game process during the game battle. By displaying the prompt information in the display area of the battle information, other players in the same camp can be informed of virtual reward information obtained by teammates, thereby improving team morale and improving the satisfaction of players who control the target virtual characters.

In this embodiment of this application, before the electronic device obtains the behavior information of at least one virtual character in the target camp during the teamfight, the allocation method for virtual reward resources further includes: obtaining, by the electronic device and for each game client participating in the game, a frame synchronization instruction generated by each game client during the teamfight, the frame synchronization instruction including to-be-verified behavior information of the virtual character controlled by each game client; and transmitting the frame synchronization instruction generated by each game client to another game client participating in the game, so that each game client performs consistency verification on the received frame synchronization instruction.

In this embodiment of this application, the effects of performing consistency verification includes preventing cheaters of some game clients from simulating frame synchronization instructions. The game client checks data of the player and player behavior in a plurality of dimensions. Frame synchronization instructions that fail in being checked are not executed. When the network is not good and repeated operations occur, repeated execution of instructions can also be avoided.

Figure 5:
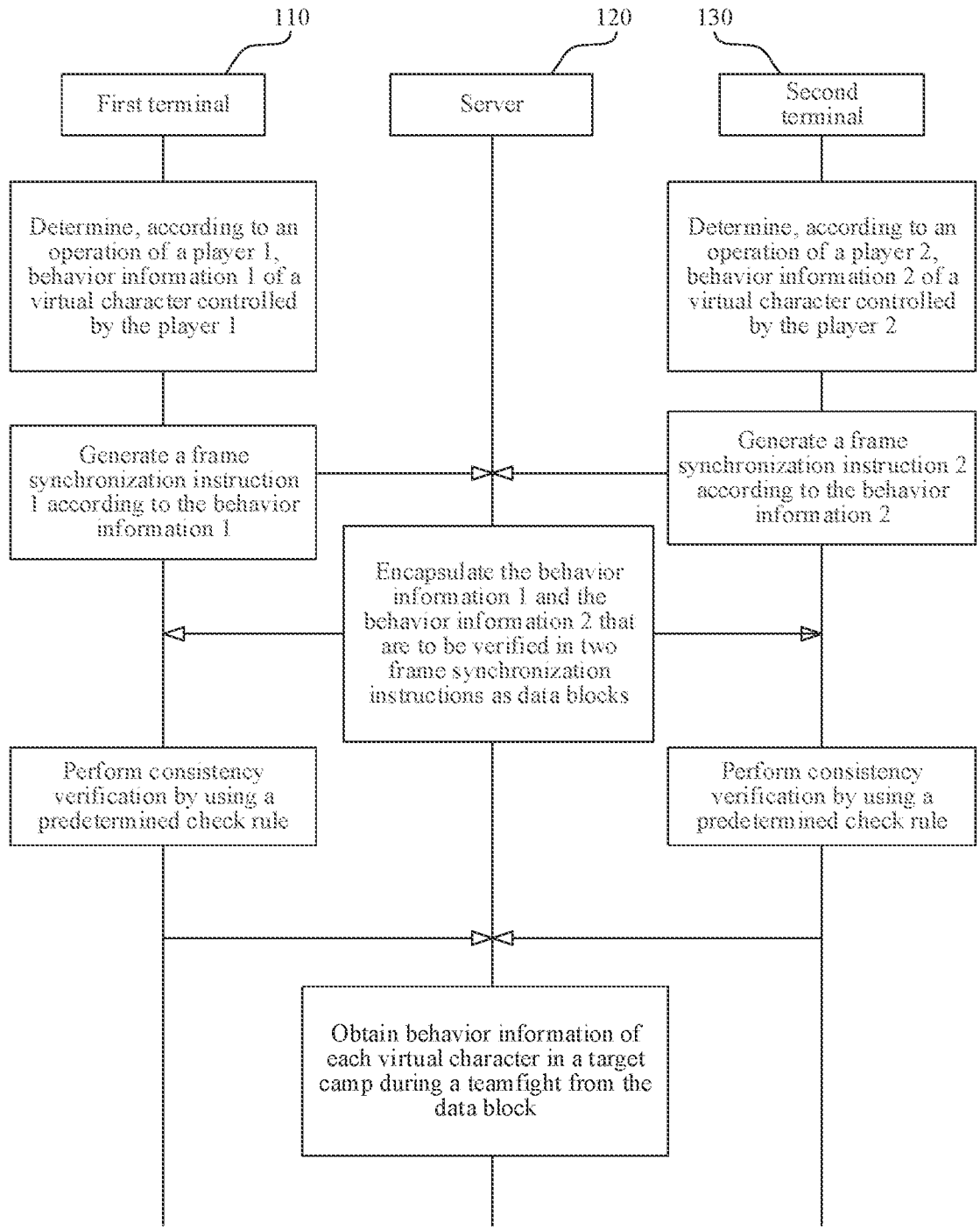
FIG. 5 is a schematic flowchart of frame synchronization according to an embodiment of this application.

FIG. 5 is a schematic flowchart of frame synchronization according to an embodiment of this application. This process is applied in the implementation environment shown in FIG. 1. The first terminal 110 determines behavior information 1 of a virtual character controlled by a player 1 according to the operation of the player 1 (the first user 112), the behavior information 1 being to-be-verified behavior information, generates a frame synchronization instruction 1 according to the behavior information 1, and transmits the frame synchronization instruction to the server 120.

The second terminal 130 determines behavior information 2 of a virtual character controlled by a player 2 according to the operation of the player 2 (the second user 132), the behavior information 2 being to-be-verified behavior information, generates a frame synchronization instruction 2 according to the behavior information 2, and transmits the frame synchronization instruction to the server 120.

The server 120 generates a logic frame every preset time (for example, 66 milliseconds). During a period of time in which the logic frame is located, after receiving the frame synchronization instruction 1 and the frame synchronization instruction 2, the server 120 encapsulates the behavior information 1 and the behavior information 2 that are to-be-verified behavior in the two frame synchronization instructions as data blocks. At the end of the period of time in which the logic frame is located, the data blocks are transmitted to the first terminal 110 and the second terminal 130. The data block includes a frame number of the logic frame. After receiving the data blocks, the first terminal 110 and the second terminal 130 can determine, in the logic frame, which behavior information is performed by the two virtual characters.

After receiving the data blocks, the first terminal 110 and the second terminal 130 perform consistency verification by using a predetermined check rule, and if the verification is successful, transmit feedback information that the consistency verification is successful to the server 120; and if the verification fails, transmit feedback information that the consistency verification fails to the server 120.

The server 120 obtains, from the data block, behavior information of each virtual character in the target camp during the teamfight according to the received feedback information that the consistency verification is successful, so as to obtain at least one piece of behavior information corresponding to at least one virtual character in the target camp.

In this embodiment of this application, the determining, by an electronic device, according to behavior information, contribution information achieved by each virtual character in a target camp during a teamfight includes: determining, by the electronic device and according to the behavior information, an achievement status of each virtual character in the target camp for predetermined game objective during the teamfight, and determining the contribution information according to the achievement status.

The behavior information in this embodiment of this application not only includes a unique identifier of a behavior applying party, a unique identifier of a behavior receiving party, and a specific behavior, but also includes actual damage caused by the specific behavior to the behavior receiving party and a status of the receiving party after receiving the actual damage. For example, a normal attack of a virtual character 1 to a virtual character 2 is 24 points. However, due to a high defense attribute of the virtual character 2, 10 points of damage is offset, and actual damage is of 12 points. In another example, a control time applied by the virtual character 1 to the virtual character 2 is 3s. However, due to a time of a defense attribute of the virtual character 2 or some processing performed on the virtual character 2 by a virtual teammate, the control time is offset to some extent, and finally, the virtual character 2 is only controlled for 2s, so that the actual damage lasts for 2s.

Table 2 exemplarily shows the behavior information of this embodiment of this application, and each piece of behavior information in a game battle can be recorded according to a time when a behavior occurs.

TABLE 2

| Occurrence time | Behavior applying party | Behavior receiving party | Specific behavior | Actual damage | State |
|---|---|---|---|---|---|
| 00:14:12 | sdhfjk001 | qwri23 | Normal attack: 50 | 40 | Survival; Blood volume: 244-204 |
| 00:14:31 | sdhfjk001 | qwri23 | Skill 1: 74 | 70 | Survival; Blood volume: 204-134 |
| 00:14:35 | sdhfjk001 | qwri23 | Skill 3: 100+ Control for 3 s | 80+ limited for 3 s | Survival; Limited Blood volume: 134-54 |
| 00:14:45 | sdhfjk001 | Lko4i | Skill 2: 55 | 50 | Dead |

Table 2 shows behavior information that is in the 14th minute and 12 seconds to the 14th minute and 45 seconds during a teamfight and that is of a virtual character whose unique identifier is sdhfjk001 in the target camp. Compared with Table 1, Table 2 adds actual damage and status information. Using the behavior information at 14 minutes and 35 seconds as an example, the virtual character whose unique identifier is sdhfjk001 applies a virtual skill 3 to a virtual character whose unique identifier is qwri23, panel damage of the virtual skill 3 is 100 points of damage and controlling for 3s. An actual damage received by the virtual character whose unique identifier is qwri23 is 80 points and the virtual character is limited for 3s, a state of the virtual character is updated to a survival state and a limited state, and a blood volume is reduced from 134 to 54. It can be learned that, according to the behavior information, it can be determined which virtual characters cause damage to the virtual character, and a value and ratio of damage caused by each virtual character. Using the behavior information at 14 minutes and 45 seconds as an example, after a virtual character whose unique identifier is Lko4i is damaged by skill 2, an actual damage is 50, and a state of the virtual user whose unique identifier is Lko4i is updated to a death state, that is, a blood volume is reduced to 0. It can be learned that a killing object of the virtual character can be determined according to the behavior information.

In this embodiment of this application, the contribution information is determined according to the achievement status of the virtual character in the target camp for the predetermined game objective during the teamfight. The predetermined game objective is described below by using a game objective in a MOBA game.

(1) An objective such as an objective I or an objective II corresponding to a control behavior.

Objective I: A virtual character in a target camp controls at least one virtual character in an enemy camp, a control time exceeds a preset time during a teamfight, and during the control period, at least one virtual character in the enemy camp is updated from a survival state to a death state.

Objective II: During the teamfight, a first-hand control is performed, the quantity of participants in the enemy camp is greater than 1, and during the control period, at least one virtual character in the enemy camp is updated from a survival state to a death state. The first-hand control in this embodiment of this application is that during the teamfight, before launching an attack, a virtual object in the enemy camp is restrained from moving and/or incapable of attacking.

(2) An objective such as an objective III or an objective IV corresponding to an attack behavior.

Objective III: When a virtual character in the enemy camp causes more than a preset ratio of a blood volume of a virtual character in a neutral camp to be lost, the virtual character in the neutral camp is killed.

Objective IV: The attack behavior causes the loss of the blood volume of the virtual character in the enemy camp to reach a preset value or a preset ratio, the quantity of participants in the enemy camp to be greater than 1, and causes at least one virtual character in the enemy camp to be updated from a survival state to a death state.

(3) An objective such as an objective V corresponding to a damage-receiving behavior.

Objective V: During the teamfight, damage received reaches a preset value, the quantity of participants in the enemy camp is greater than 1, and at least one virtual character in the enemy camp is updated from a survival state to a death state during the teamfight.

For the objective I, an electronic device determines, according to an actual damage in behavior information of a virtual object of the target camp, whether the virtual character in the target camp controls at least one virtual character in the enemy camp. If yes, the determining is continued according to the actual damage and a state. If it is determined according to the actual damage and state that the virtual character of the enemy camp is controlled for a time longer than the preset time, and at least one virtual character of the enemy camp is updated from a survival state to a death state, it is determined that the objective I is achieved.

For the objective II, the electronic device determines, according to the actual damage in the behavior information of the virtual object of the target camp, whether the virtual character in the target camp performs a first-hand control. If yes, the determining is continued according to a state of a controlled virtual character in the enemy camp. If the quantity of participants in the enemy camp is greater than 1, and during the control period, at least one virtual character in the enemy camp is updated from a survival state to a death state, it is determined that the objective II is achieved.

For the objective HI, the electronic device determines, according to a state in the behavior information of the virtual object of the target camp, whether the virtual character kills the virtual character in the neutral camp. If yes, a state of the virtual character in the neutral camp is obtained from the behavior information. If a loss of the virtual character in the neutral camp exceeding the preset ratio is caused by the virtual character in the target camp, it is determined that the objective III is achieved.

For the objective IV, the electronic device determines, according to the state in the behavior information of the virtual object of the target camp, whether the loss of the blood volume of the virtual character in the enemy camp directly caused by the attack behavior reaches the preset value or the preset ratio. If yes, the determining is continued according to the state of the virtual object of the enemy camp. If it is determined according to state information of the virtual object in the enemy camp that the quantity of participants in the enemy camp is greater than 1 and at least one virtual character in the enemy camp is updated from the survival state to the death state, it is determined that the objective IV is achieved.

For the objective V, the electronic device determines the actual damage received by the virtual object during the teamfight based on the behavior information of the virtual object of the target camp. If a value of the actual damage reaches the preset value, the determining is continued according to the state information of the virtual object of the enemy camp. If it is determined according to state information of the virtual object in the enemy camp that the quantity of participants in the enemy camp is greater than 1 and at least one virtual character in the enemy camp is updated from the survival state to the death state during the teamfight, it is determined that the objective V is achieved.

In addition, for each contribution type, in this embodiment of this application, a corresponding virtual reward resource is set, and there are differences in the virtual reward resources corresponding to different contribution types. For example, some virtual reward resources can increase a money attribute of a virtual object, some can increase a defense attribute of a virtual object, and some can increase an attack attribute of a virtual object, which is not specifically limited in this embodiment of this application. By setting different virtual rewards for different contribution types, different virtual rewards can be given to virtual characters with different roles in a game, thereby enhancing the fun of teamfights, and increasing quantity and rate of participation in battles, which is conducive to speeding up the game process, shortening the game duration, and reducing the operation pressure on the server. A participation rate is a frequency of a user participating in effective teamfights.

The quantity of valid teamfight events that a specific virtual character participates in can be determined, and based on the quantity of teamfight events participated and a total quantity of teamfights, the participation rate of the virtual character can be obtained.

In this embodiment of this application, the determining, by the electronic device and according to contribution information, a target virtual character and a target virtual reward resource corresponding to the target virtual character from at least one virtual character included in the target camp includes S301 to S304.

S301. Determine, according to an achievement status corresponding to the contribution information, a virtual character that achieves at least one game objective and that is in at least one virtual character included in the target camp as the target virtual character.

During a teamfight, there may be differences in the game objectives that can be achieved by virtual characters with different roles. For example, a virtual character whose role is positioned as an assistor often needs to receive damage in teamfights as much as possible to create opportunities for teammates to output damage, while a virtual character whose role is positioned as a jungler (who eliminates a virtual character, also referred to as a wild monster in a neutral camp in a game) often needs to reduce jungle income of the enemy camp as much as possible. Therefore, different virtual characters often have different game objectives in teamfights. In this embodiment of this application, the achievement status of each virtual character in the target camp for a predetermined game objective during a teamfight is counted, a virtual character that achieves at least one game objective and that is in the target camp is determined according to the achievement status, and finally, the virtual character that achieves the at least one game objective and that is in the target camp is determined as the target virtual character. The achievement status represents whether each virtual character achieves a predetermined effective objective.

S302. Determine at least one contribution type in a one-to-one correspondence with the at least one game objective according to a correspondence between the predetermined game objective and a contribution type.

In this embodiment of this application, a corresponding contribution type is set for each game objective, and there are differences in the contribution types corresponding to different game objectives. Therefore, the contribution type corresponding to each game objective is predetermined in this embodiment of this application. For example, for the objective I, a corresponding contribution type is to trigger a crucial control. For the objective II, a corresponding contribution type is to trigger a crucial teamfight. For the objective III, a corresponding contribution type is to trigger a crucial grab. For the objective IV, a corresponding contribution type is to trigger a crucial output. For the objective V, a corresponding contribution type is to trigger crucial damage receiving.

S303. Determine a candidate virtual reward resource in a one-to-one correspondence with at least one piece of contribution information according to a correspondence between a predetermined contribution type and a virtual reward resource.

During the teamfight, the target virtual character may achieve more than one contribution type. A virtual reward resource in a one-to-one correspondence with each contribution type achieved needs to be determined, and a virtual reward resource corresponding to at least one piece of contribution information is used as a candidate virtual reward resource.

S304. Determine at least one virtual reward resource determined from the candidate virtual reward resources as the target virtual reward resource.

After the candidate virtual reward resource is determined, the candidate virtual reward resource can be used as the target virtual reward resource, or a virtual reward resource with a highest priority in the candidate virtual reward resources can be used as the target virtual reward resource.

In this embodiment of this application, a priority relationship of the virtual reward resource may be pre-configured, for example, priorities of triggering a crucial output, triggering a crucial teamfight, triggering a crucial control, triggering crucial damage receiving, and triggering a crucial grab that are configured decrease progressively.

In addition, a virtual reward resource with a highest priority may also be specified by a player. For example, when a target virtual character achieves a plurality of game objectives and corresponds to a plurality of contribution types, a plurality of virtual reward resources corresponding to the plurality of contribution types are displayed to a player who controls the target virtual character, and in response to a selection operation of the player on one of the virtual reward resources, a virtual reward resource corresponding to the selection operation is used as the virtual reward resource with the highest priority. Determining a target virtual reward resource in a manner of performing a selection operation by a player can further enhance the fun of participating in teamfights and promote the occurrence of teamfights in a game battle.

Figure 6:
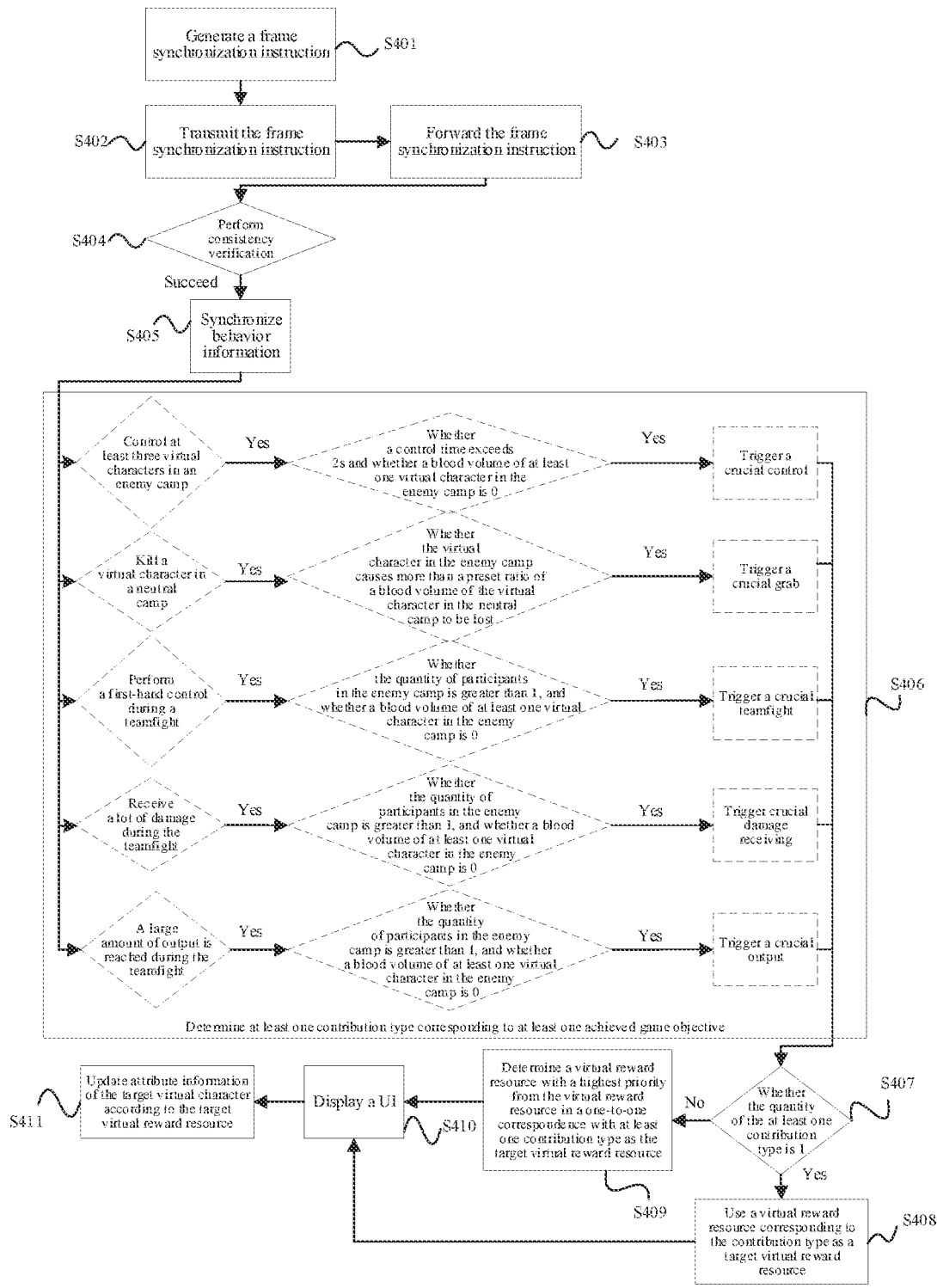
FIG. 6 is a first schematic flowchart of an allocation method for virtual reward resources according to an embodiment of this application.

FIG. 6 is a first schematic flowchart of an allocation method for virtual reward resources according to an embodiment of this application, and the description is made below with reference to steps shown in FIG. 6.

S401. Generate a frame synchronization instruction.

A game client generates a frame synchronization instruction in response to an operation instruction of a player, the frame synchronization instruction including to-be-verified behavior information of a virtual character controlled by the game client.

S402. Transmit the frame synchronization instruction.

The game client transmits the frame synchronization instruction to a server.

S403. Forward the frame synchronization instruction.

The server forwards the frame synchronization instruction to each game client in a game battle.

S404. Perform consistency verification.

The game client performs consistency verification on the received frame synchronization instruction.

S405. Synchronize behavior information.

If the consistency verification on the frame synchronization instruction is successful in the game client, the behavior information is synchronized to the server.

S406. Determine at least one contribution type corresponding to at least one achieved game objective.

The server determines, according to the behavior information being successfully verified, an achievement status of each virtual character in a target camp for a predetermined game objective during a teamfight, determines the at least one achieved game objective based on the achievement status, and determines at least one contribution type in a one-to-one correspondence with the at least one achieved game objective according to a correspondence between the predetermined game objective and a contribution type.

Exemplarily, when the predetermined effective objectives are five game objectives, there are five corresponding contribution types, which are described below.

For a game objective I, the server determines whether at least three virtual characters in an enemy camp are controlled. If yes, it is to be determined whether a control duration exceeds 2s and whether a blood volume of at least one virtual character in the enemy camp is 0. If yes, it is determined that the game objective is achieved and a corresponding contribution type: trigger a crucial control is determined.

For a game objective II, the server determines whether first-hand control is performed during the teamfight. If yes, it is to be determined whether the quantity of participants in the enemy camp is greater than 1 and whether a blood volume of at least one virtual character in the enemy camp is 0. If yes, it is determined that the game objective is achieved and a corresponding contribution type: trigger a crucial teamfight is determined.

For a game objective III, the server determines whether a virtual character a neutral camp is killed. If yes, it is to be determined whether the virtual character in the enemy camp causes more than a preset ratio (for example, 70%) of a blood volume of the virtual character in the neutral camp to be lost. If yes, it is determined that the game objective is achieved and a corresponding contribution type: trigger a crucial grab is determined.

For a game objective IV, the server determines whether the loss of the blood volume of the virtual character in the enemy camp reaches a preset value or the preset ratio during the teamfight. If yes, it means that a large amount of output is reached during the teamfight, and it is to be determined whether the quantity of participants in the enemy camp is greater than 1 and whether a blood volume of at least one virtual character in the enemy camp is 0. If yes, it is determined that the game objective is achieved and a corresponding contribution type: trigger a crucial output is determined.

For a game objective V, the server determines whether damage received during the teamfight reaches the preset value. If yes, it means that a large amount of damage received is reached during the teamfight, and it is to be determined whether the quantity of participants in the enemy camp is greater than 1 and whether a blood volume of at least one virtual character in the enemy camp is 0. If yes, it is determined that the game objective is achieved and a corresponding contribution type: trigger crucial damage receiving is determined.

The at least one game objective is at least one of five game objectives, and the at least one contribution type is at least one of five contribution types.

S407. Determine whether the quantity of the at least one contribution type is 1.

The server determines whether the quantity of contribution types included in at least one contribution type is 1, if yes, S408 is performed, otherwise, S409 is performed.

S408. Use a virtual reward resource corresponding to the contribution type as a target virtual reward resource. S410 is performed.

S409. Determine a virtual reward resource with the highest priority from the virtual reward resource in a one-to-one correspondence with at least one contribution type as the target virtual reward resource.

S410. Display a UI.

The game client displays the target virtual reward resource on the UI.

S411. Update attribute information of the target virtual character according to the target virtual reward resource.

In this embodiment of this application, the determining, by an electronic device and according to behavior information, contribution information achieved by each virtual character in a target camp during a teamfight includes: determining, in a case of determining that the enemy camp includes a dead virtual character and according to information related to the dead virtual character in the behavior information, the contribution information achieved by each virtual character in the target camp during the teamfight.

The enemy camp is a camp having a hostile relationship with the target camp, the dead virtual character is a virtual character that changes from a survival state to a death state during the teamfight, and the contribution information is used for representing a correlation degree between each virtual character in the target camp and the dead virtual character that changes from the survival state to the death state.

In this embodiment of this application, after the blood volume of the virtual character in the enemy camp during the teamfight is determined to be 0 by using the state recorded in the behavior information, corresponding contribution information is determined according to the participation situation of the virtual characters in the target camp in killing the virtual characters in the enemy camp.

The participation situation includes participation information such as the damage and control caused by the virtual character participating in the killing to the virtual character killed in each killing event, the damage received by the virtual object being killed, and the healing provided for the virtual character participating in the killing. The kill event is an event of killing the virtual character in the enemy camp.

In this embodiment of this application, different weights may be set for pieces of participation information, and the corresponding contribution information may be determined with reference to specific values of the participation information. The calculation process of the contribution information is shown in formula (1).

$$\text{Contribution information} = A*\text{damage ratio} + B*\text{damage receiving ratio} + C*\text{control ratio} + D*\text{healing ratio} \quad (1);$$

where A to D represent the weights corresponding to different participation information, and the damage ratio, the damage receiving ratio, the control ratio, and the healing ratio are the contribution information.

It is to be understood that the damage ratio is a ratio of an actual damage caused by a virtual character in a target camp to a virtual character killed during a teamfight to a total damage received by the virtual character that is hit during the teamfight. For example, the total damage received by the virtual character during the teamfight is 100 points, where a virtual character 1 in the target camp causes 20 points of actual damage to the killed virtual character, a virtual character 2 causes 30 points of actual damage to the killed virtual character, a virtual character 3 causes 40 points of actual damage to the killed virtual character, and a virtual character 4 causes 10 points of actual damage to the killed virtual character, so that a damage ratio of the virtual character 1 in the target camp is 0.2. Similarly, the damage receiving ratio is, during the teamfight, a ratio of a damage outputted by the killed virtual character and received by the virtual character in the target camp to a total damage outputted by the killed virtual character. The control ratio is, during the teamfight, a ratio of a time that the virtual character in the target camp controls the killed virtual character to a total time that the killed virtual character is controlled. The healing ratio is a ratio of healing of the virtual character in the target camp to other virtual characters that participating in killing in the same camp to total healing of other virtual characters that participating in the killing in the same camp.

In this embodiment of this application, the determining, by the electronic device and according to the contribution information, a target virtual character and a target virtual reward resource corresponding to the target virtual character from at least one virtual character included in the target camp includes: using, by the electronic device, a virtual character with a highest correlation degree in the target camp as a candidate virtual character based on the correlation degree corresponding to the contribution information; and determining the candidate virtual character as the target virtual character in a case of determining that the candidate virtual character is an assistant of the dead virtual character, and determining a preset virtual reward resource as the target virtual reward resource.

The contribution information in this embodiment of this application can reflect the correlation degree between at least one virtual character in the target camp and the dead virtual character that changes from the survival state to the death state. Therefore, sorting the correlation degrees may further determine the virtual character with the highest correlation degree. In this embodiment of this application, after the virtual character with the highest correlation degree is determined, it is also necessary to determine whether the virtual character is an assistant of the dead virtual character, that is, it is necessary to determine that the virtual character is not a killer who kills the dead virtual character. In this embodiment of this application, rewards for the assistant in teamfights are added, thereby overcoming the disadvantage of "grabbing a head" due to only rewarding the killer, maintaining the fairness of the game, truly promoting teamwork in the game battle, and promoting the teamfights.

Figure 7:
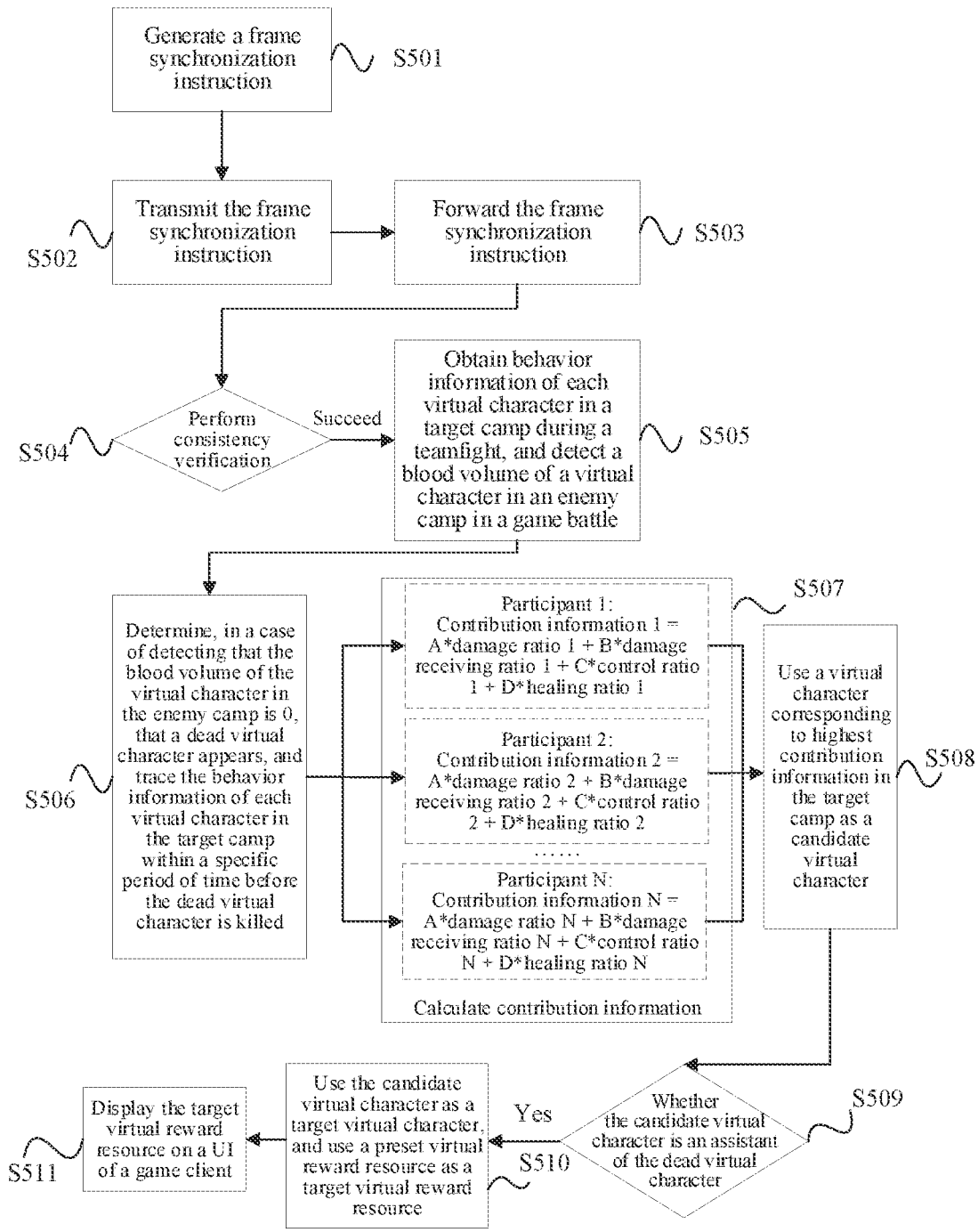
FIG. 7 is a second schematic flowchart of an allocation method for virtual reward resources according to an embodiment of this application.

FIG. 7 is a second schematic flowchart of an allocation method for virtual reward resources according to an embodiment of this application. As shown in FIG. 7, S501 to S510 are included, and the steps are described below.

S501. Generate a frame synchronization instruction.

A game client generates a frame synchronization instruction in response to an operation instruction of a player, the frame synchronization instruction including to-be-verified behavior information of a virtual character controlled by the game client.

S502. Transmit the frame synchronization instruction.

The game client transmits the frame synchronization instruction to a server.

S503. Forward the frame synchronization instruction.

The server forwards the frame synchronization instruction to each game client in a game battle.

S504. Perform consistency verification.

The game client performs consistency verification on the received frame synchronization instruction. If the consistency verification is successful, the operation instruction of the player synchronized to the server to implement behavior information synchronization.

S505. Obtain behavior information of each virtual character in a target camp during a teamfight, and detect a blood volume of a virtual character in an enemy camp in a game battle.

S506. Determine, in a case of detecting that the blood volume of the virtual character in the enemy camp is 0, that a dead virtual character appears, and trace the behavior information of each virtual character in the target camp within a specific period of time before the dead virtual character is killed.

The behavior information includes an actual damage to the dead virtual character, damage received, a control time caused, healing for friendly virtual characters, and the like.

S507. Calculate contribution information.

The server calculates corresponding contribution information according to formula (1) for each virtual character in the target camp that participates in killing the dead virtual character.

Exemplarily, when the virtual character in the target camp participating in killing the dead virtual character is referred to as a participant 1, for N participants, the contribution information corresponding to each participant is obtained by formula (1): Participant 1: Contribution information 1=A*damage ratio 1+B*damage receiving ratio 1+C*control ratio 1+D*healing ratio 1; Participant 2: Contribution information 2=A*damage ratio 2+B*damage receiving ratio 2+C*control ratio 2+D*healing ratio 2; . . . ; Participant N: Contribution information N=A*damage ratio N+B*damage receiving ratio N+C*control ratio N+D*healing ratio N.

S508. Use a virtual character corresponding to the highest contribution information in the target camp as a candidate virtual character.

S509. Determine whether the candidate virtual character is an assistant of the dead virtual character. If yes, perform S510.

S510. Use the candidate virtual character as the target virtual character, and use a preset virtual reward resource as a target virtual reward resource.

S511. Display the target virtual reward resource on a UI of the game client.

Figure 8:
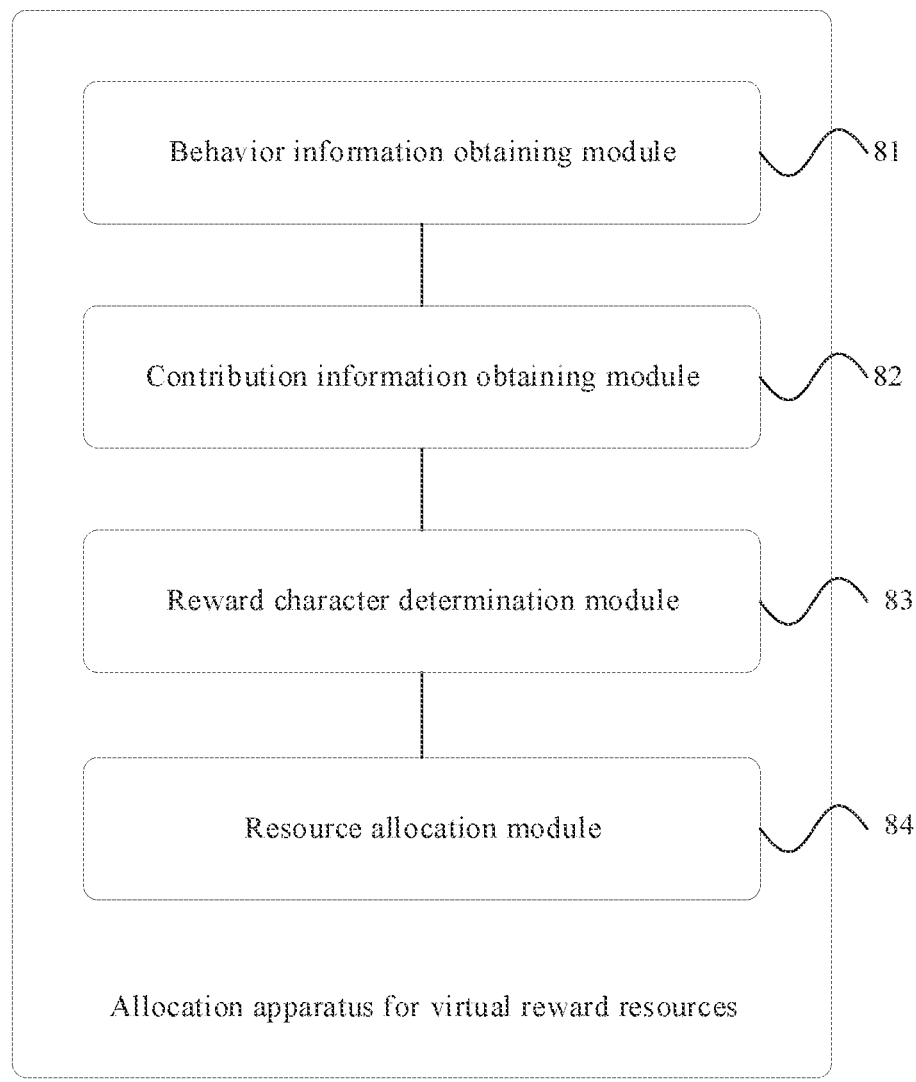
FIG. 8 is a schematic structural diagram of an allocation apparatus for virtual reward resources according to an embodiment of this application.

An embodiment of this application provides an allocation apparatus for virtual reward resources, as shown in FIG. 8, the apparatus may include: a behavior information obtaining module 81, a contribution information obtaining module 82, a reward character determination module 83, and a resource allocation module 84. Specifically, the behavior information obtaining module 81 is configured to obtain behavior information of each virtual character in a target camp during a teamfight, the target camp including at least one virtual character, the behavior information being a behavior applied by each virtual character in the target camp to a virtual object, and the virtual object being a virtual character in at least one of the target camp or an enemy camp;

the contribution information obtaining module 82 is configured to determine, according to the behavior information, contribution information achieved by each virtual character in the target camp during the teamfight;

the reward character determination module 83 is configured to determine, according to the contribution information, a target virtual character and a target virtual reward resource corresponding to the target virtual character from the at least one virtual character included in the target camp; and the resource allocation module 84 is configured to update attribute information of the target virtual character according to the target virtual reward resource.

The allocation apparatus for virtual reward resources provided in the embodiments of this application performs the allocation method for virtual reward resources provided in the embodiments of this application. In the allocation apparatus for virtual reward resources provided in this embodiment of this application, behavior information of each virtual character in a target camp during a teamfight is obtained, and contribution information achieved by each virtual character in the target camp during the teamfight is determined according to the behavior information, thereby laying the foundation for subsequently flexibly determining a target virtual character and a target virtual reward resource according to the contribution information, and overcoming the disadvantages of small differences in virtual reward resources, low enthusiasm for participating in teamfights, and long game time and slow rhythm caused by only considering a behavior of a virtual character to determine the virtual reward resources. The target virtual character and the corresponding target virtual reward resource are further determined from the target camp according to the contribution information, attribute information of a corresponding target virtual character is updated according to the target virtual reward resource, and the virtual reward resources can be dynamically allocated according to behaviors of the virtual characters in each teamfight, thereby improving players' participation in teamfights, improving the compactness and fun of the game, and relatively reducing the time-consuming of each round of game and reducing the processing pressure of a server.

In this embodiment of this application, the allocation apparatus for virtual reward resources further includes the following modules:

a frame synchronization instruction, configured to obtain a frame synchronization instruction generated by each game client participating in a game during the teamfight, the frame synchronization instruction including to-be-verified behavior information of a virtual character controlled by each game client; and a forward module, configured to transmit the frame synchronization instruction generated by each game client to another game client participating in the game, so that each game client performs consistency verification on the received frame synchronization instruction; and the behavior information obtaining module, being further configured to obtain the behavior information of each virtual character in the target camp during the teamfight based on received feedback information transmitted by each game client and indicating that the consistency verification is successful.

In this embodiment of this application, the contribution information obtaining module is further configured to determine, according to the behavior information, an achievement status of each virtual character in the target camp for a predetermined game objective during the teamfight; and determine the achievement status as the contribution information.

In this embodiment of this application, the reward character determination module includes the following modules:

a target virtual character determination module, configured to determine, according to the achievement status corresponding to the contribution information, a virtual character that achieves at least one game objective and that is in the at least one virtual character included in the target camp as the target virtual character;

a candidate resource determination module, configured to determine at least one contribution type in a one-to-one correspondence with the at least one game objective according to a correspondence between the predetermined game objective and a contribution type; and determine a candidate virtual reward resource in a one-to-one correspondence with at least one piece of contribution information according to a correspondence between a predetermined contribution type and a virtual reward resource; and a target resource determination module, configured to determine at least one virtual reward resource determined from the candidate virtual reward resources as the target virtual reward resource.

In this embodiment of this application, the target resource determination module is further configured to determine the candidate virtual reward resource as the at least one virtual reward resource; or determine a virtual reward resource with a highest priority in the candidate virtual reward resources as the at least one virtual reward resource.

In this embodiment of this application, the contribution information obtaining module is further configured to determine, in a case of determining that the enemy camp includes a dead virtual character and according to information related to the dead virtual character in the behavior information, the contribution information achieved by each virtual character in the target camp during the teamfight, the enemy camp being a camp having a hostile relationship with the target camp, the dead virtual character being a virtual character that changes from a survival state to a death state during the teamfight, and the contribution information being used for representing a correlation degree between each virtual character in the target camp and the dead virtual character that changes from the survival state to the death state.

In this embodiment of this application, the reward character determination module includes the following modules:

a correlation degree sorting module, configured to determine a virtual character with a highest correlation degree in the at least one virtual character included in the target camp as a candidate virtual character based on the correlation degree corresponding to the contribution information; and a resource corresponding module, configured to determine the candidate virtual character as the target virtual character in a case of determining that the candidate virtual character is an assistant of the dead virtual character, and determine a preset virtual reward resource as the target virtual reward resource.

An embodiment of this application provides an electronic device, including a memory and a processor, where at least one program is stored in the memory, the program, when being executed by the processor, causing the processor to perform corresponding content in the foregoing method embodiments. Behavior information of each virtual character in a target camp during a teamfight is obtained, and contribution information achieved by each virtual character in the target camp during the teamfight is determined according to the behavior information, thereby laying the foundation for subsequently flexibly determining a target virtual character and a target virtual reward resource according to the contribution information, and overcoming the disadvantages of small differences in virtual reward resources, low enthusiasm for participating in teamfights, and long game time and slow rhythm caused by only considering a behavior of a virtual character to determine the virtual reward resources. The target virtual character and the corresponding target virtual reward resource are further determined from the target camp according to the contribution information, attribute information of a corresponding target virtual character is updated according to the target virtual reward resource, and the virtual reward resources can be dynamically allocated according to behaviors of the virtual characters in each teamfight, thereby improving players' participation in teamfights, improving the compactness and fun of the game, and relatively reducing the time-consuming of each round of game and reducing the processing pressure of a server.

Figure 9:
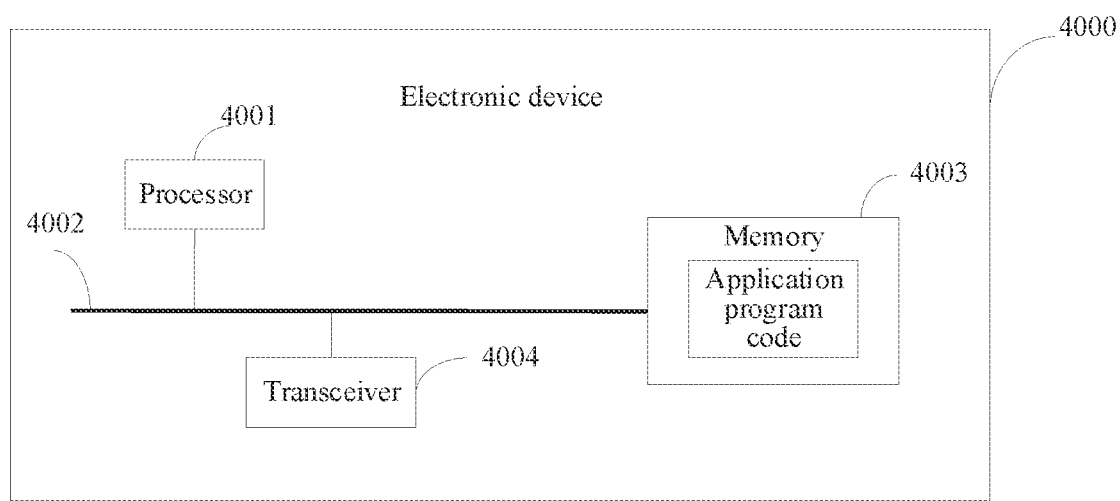
FIG. 9 is a schematic structural diagram of an electronic device according to an embodiment of this application.

As shown in FIG. 9, the electronic device 4000 shown in FIG. 9 includes a processor 4001 and a memory 4003. The processor 4001 and the memory 4003 are connected, for example, are connected by using a bus 4002. In some embodiments, the electronic device 4000 may further include a transceiver 4004. In an actual application, there may be one or more transceivers 4004. The structure of the electronic device 4000 does not constitute a limitation on this embodiment of this application.

The processor 4001 may be a central processing unit (CPU), a general purpose processor, a digital signal processor (DSP), an application-specific integrated circuit (ASIC), a field programmable gate array (FPGA), or another programmable logic device, a transistor logic device, a hardware component, or any combination thereof. The processor may implement or perform various examples of logic blocks, modules, and circuits described with reference to content disclosed in this application. The processor 4001 may be alternatively a combination to implement a computing function, for example, may be a combination of one or more microprocessors, or a combination of a DSP and a microprocessor.

The bus 4002 may include a channel, to transmit information between the foregoing components. The bus system 4002 may be a peripheral component interconnect (PCI) bus, an extended industry standard architecture (EISA) bus, or the like. The bus 4002 may be classified into an address bus, a data bus, a control bus, and the like. For ease of description, the bus in FIG. 9 is represented by using only one line, but this does not indicate that there is only one bus or one type of bus.

The memory 4003 may be a read-only memory (ROM) or a static storage device of another type that can store static information and instructions, a random access memory (RAM) or a dynamic storage device of another type that can store information and instructions, or an electrically erasable programmable read-only memory (EEPROM), a compact disc read-only memory (CD-ROM) or other optical disk storage, optical disc storage (including a compact disc, a laser disc, an optical disc, a digital versatile disc, or a Blu-ray disc, a disk storage medium or another magnetic storage device, or any other medium that can be used to carry or store expected program code in a command or data structure form and that can be accessed by a computer, but is not limited thereto.

The memory 4003 is configured to store application program code for performing the solutions of this application, and is controlled and executed by the processor 4001. The processor 4001 is configured to execute application program code stored in the memory 4003 to implement the allocation method for virtual reward resources provided in the embodiments of this application.

An embodiment of this application provides a non-transitory computer-readable storage medium, storing a computer program, the computer program, when run on a computer, causing the computer to perform corresponding content in the foregoing method embodiments. Behavior information of each virtual character in a target camp during a teamfight is obtained, and contribution information achieved by each virtual character in the target camp during the teamfight is determined according to the behavior information, thereby laying the foundation for subsequently flexibly determining a target virtual character and a target virtual reward resource according to the contribution information, and overcoming the disadvantages of small differences in virtual reward resources, low enthusiasm for participating in teamfights, and long game time and slow rhythm caused by only considering a behavior of a virtual character to determine the virtual reward resources. The target virtual character and the corresponding target virtual reward resource are further determined from the target camp according to the contribution information, attribute information of a corresponding target virtual character is updated according to the target virtual reward resource, and the virtual reward resources can be dynamically allocated according to behaviors of the virtual characters in each teamfight, thereby improving players' participation in teamfights, improving the compactness and fun of the game, and relatively reducing the time-consuming of each round of game and reducing the processing pressure of a server.

An embodiment of this application provides a computer program, the computer program including computer instructions, the computer instructions being stored in a computer-readable storage medium, a processor of a computer device reading the computer instructions from the computer-readable storage medium, and a processor executing the computer instructions to cause the computer device to perform the content shown in the foregoing method embodiments. Compared with the related art, behavior information of each virtual character in a target camp during a teamfight is obtained, and contribution information achieved by each virtual character in the target camp during the teamfight is determined according to the behavior information, thereby laying the foundation for subsequently flexibly determining a target virtual character and a target virtual reward resource according to the contribution information, and overcoming the disadvantages of small differences in virtual reward resources, low enthusiasm for participating in teamfights, and long game time and slow rhythm caused by only considering a behavior of a virtual character to determine the virtual reward resources. The target virtual character and the corresponding target virtual reward resource are further determined from the target camp according to the contribution information, attribute information of a corresponding target virtual character is updated according to the target virtual reward resource, and the virtual reward resources can be dynamically allocated according to behaviors of the virtual characters in each teamfight, thereby improving players' participation in teamfights, improving the compactness and fun of the game, and relatively reducing the time-consuming of each round of game and reducing the processing pressure of a server.

It is to be understood that, although the steps in the flowchart in the accompanying drawings are sequentially shown according to indication of an arrow, the steps are not necessarily sequentially performed according to a sequence indicated by the arrow. Unless explicitly specified in this specification, execution of the steps is not strictly limited in the sequence, and the steps may be performed in other sequences. In addition, at least some steps in the flowcharts in the accompanying drawings may include a plurality of substeps or a plurality of stages. The substeps or the stages are not necessarily performed at the same moment, but may be performed at different moments. The substeps or the stages are not necessarily performed in sequence, but may be performed in turn or alternately with another step or at least some of substeps or stages of the another step. Further, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

The foregoing descriptions are some implementations of this application. A person of ordinary skill in the art may make several improvements and refinements without departing from the principle of this application, and the improvements and refinements shall fall within the protection scope of this application.

What is claimed is:

1. A method for allocating virtual reward resources performed by an electronic device, the method comprising:

obtaining a frame synchronization instruction generated by a first game client from a first terminal during a teamfight of a game, the frame synchronization instruction comprising to-be-verified behavior information of a virtual character controlled by the first game client;

transmitting the frame synchronization instruction generated by the first game client to a second game client participating in the game from a second terminal, so that the second game client performs consistency verification on the received frame synchronization instruction;

obtaining behavior information of each virtual character in a target camp based on received feedback information transmitted by the second game client and indicating that the consistency verification is successful, the target camp comprising at least one virtual character, the behavior information being a behavior applied by each virtual character in the target camp to a virtual object, and the virtual object being a virtual character in at least one of the target camp or an enemy camp of the game;

determining, according to the behavior information, contribution information achieved by each virtual character in the target camp during the teamfight;

determining, according to the contribution information, a target virtual character and a target virtual reward resource corresponding to the target virtual character from the at least one virtual character comprised in the target camp; and updating attribute information of the target virtual character according to the target virtual reward resource.

2. The method according to claim 1, wherein the determining, according to the behavior information, contribution information achieved by each virtual character in the target camp during the teamfight comprises:

determining, according to the behavior information, an achievement status of each virtual character in the target camp for a predetermined game objective during the teamfight; and determining the achievement status as the contribution information of each virtual character in the target camp.

3. The method according to claim 2, wherein the determining, according to the contribution information, a target virtual character and a target virtual reward resource corresponding to the target virtual character from the at least one virtual character comprised in the target camp comprises:

determining, according to the achievement status corresponding to the contribution information of each virtual character in the target camp, a virtual character that achieves at least one game objective and that is in the at least one virtual character comprised in the target camp as the target virtual character;
determining at least one contribution type in a one-to-one correspondence with the at least one game objective;
determining at least one candidate virtual reward resource in a one-to-one correspondence with the at least one contribution type; and
determining one virtual reward resource determined from the at least one candidate virtual reward resource as the target virtual reward resource.

4. The method according to claim 3, wherein the determining one virtual reward resource determined from the at least one candidate virtual reward resource as the target virtual reward resource further comprises:
determining a virtual reward resource with a highest priority in the at least one candidate virtual reward resource as the target virtual reward resource.

5. The method according to claim 1, wherein the determining, according to the behavior information, contribution information achieved by each virtual character in the target camp during the teamfight comprises:
determining, in a case of determining that the enemy camp comprises a dead virtual character and according to information related to the dead virtual character in the behavior information, the contribution information achieved by each virtual character in the target camp during the teamfight,
the enemy camp being a camp having a hostile relationship with the target camp, the dead virtual character being a virtual character that changes from a survival state to a death state during the teamfight, and the contribution information being used for representing a correlation degree between each virtual character in the target camp and the dead virtual character that changes from the survival state to the death state.

6. The method according to claim 5, wherein the determining, according to the contribution information, a target virtual character and a target virtual reward resource corresponding to the target virtual character from the at least one virtual character comprised in the target camp comprises:
determining a virtual character with a highest correlation degree in the at least one virtual character comprised in the target camp as a candidate virtual character based on the correlation degree corresponding to the contribution information; and
determining the candidate virtual character as the target virtual character in a case of determining that the candidate virtual character is an assistant of the dead virtual character, and determining a preset virtual reward resource as the target virtual reward resource.

7. An electronic device for allocation of virtual reward resources, comprising a memory, a processor, and a computer program stored on the memory and executable by the processor, the processor, when executing the program, causing the electronic device to perform a method for allocating virtual reward resources including:
obtaining a frame synchronization instruction generated by a first game client from a first terminal during a teamfight of a game, the frame synchronization instruction comprising to-be-verified behavior information of a virtual character controlled by the first game client;
transmitting the frame synchronization instruction generated by the first game client to a second game client participating in the game from a second terminal, so that the second game client performs consistency verification on the received frame synchronization instruction;
obtaining behavior information of each virtual character in a target camp based on received feedback information transmitted by the second game client and indicating that the consistency verification is successful, the target camp comprising at least one virtual character, the behavior information being a behavior applied by each virtual character in the target camp to a virtual object, and the virtual object being a virtual character in at least one of the target camp or an enemy camp of the game;
determining, according to the behavior information, contribution information achieved by each virtual character in the target camp during the teamfight;
determining, according to the contribution information, a target virtual character and a target virtual reward resource corresponding to the target virtual character from the at least one virtual character comprised in the target camp; and
updating attribute information of the target virtual character according to the target virtual reward resource.

8. The electronic device according to claim 7, wherein the determining, according to the behavior information, contribution information achieved by each virtual character in the target camp during the teamfight comprises:
determining, according to the behavior information, an achievement status of each virtual character in the target camp for a predetermined game objective during the teamfight; and
determining the achievement status as the contribution information of each virtual character in the target camp.

9. The electronic device according to claim 8, wherein the determining, according to the contribution information, a target virtual character and a target virtual reward resource corresponding to the target virtual character from the at least one virtual character comprised in the target camp comprises:
determining, according to the achievement status corresponding to the contribution information of each virtual character in the target camp, a virtual character that achieves at least one game objective and that is in the at least one virtual character comprised in the target camp as the target virtual character;
determining at least one contribution type in a one-to-one correspondence with the at least one game objective;
determining at least one candidate virtual reward resource in a one-to-one correspondence with the at least one contribution type; and
determining one virtual reward resource determined from the at least one candidate virtual reward resource as the target virtual reward resource.

10. The electronic device according to claim 9, wherein the determining one virtual reward resource determined from the at least one candidate virtual reward resource as the target virtual reward resource further comprises:
determining a virtual reward resource with a highest priority in the at least one candidate virtual reward resource as the target virtual reward resource.

11. The electronic device according to claim 7, wherein the determining, according to the behavior information, contribution information achieved by each virtual character in the target camp during the teamfight comprises:
determining, in a case of determining that the enemy camp comprises a dead virtual character and according to information related to the dead virtual character in the behavior information, the contribution information achieved by each virtual character in the target camp during the teamfight, the enemy camp being a camp having a hostile relationship with the target camp, the dead virtual character being a virtual character that changes from a survival state to a death state during the teamfight, and the contribution information being used for representing a correlation degree between each virtual character in the target camp and the dead virtual character that changes from the survival state to the death state.

12. The electronic device according to claim 11, wherein the determining, according to the contribution information, a target virtual character and a target virtual reward resource corresponding to the target virtual character from the at least one virtual character comprised in the target camp comprises:

determining a virtual character with a highest correlation degree in the at least one virtual character comprised in the target camp as a candidate virtual character based on the correlation degree corresponding to the contribution information; and determining the candidate virtual character as the target virtual character in a case of determining that the candidate virtual character is an assistant of the dead virtual character, and determining a preset virtual reward resource as the target virtual reward resource.

13. A non-transitory computer-readable storage medium, storing computer instructions, the computer instructions, when executed by a processor of an electronic device, causing the electronic device to perform a method for allocating virtual reward resources including:

obtaining a frame synchronization instruction generated by a first game client from a first terminal during a teamfight of a game, the frame synchronization instruction comprising to-be-verified behavior information of a virtual character controlled by the first game client;

transmitting the frame synchronization instruction generated by the first game client to a second game client participating in the game from a second terminal, so that the second game client performs consistency verification on the received frame synchronization instruction;

obtaining behavior information of each virtual character in a target camp based on received feedback information transmitted by the second game client and indicating that the consistency verification is successful, the target camp comprising at least one virtual character, the behavior information being a behavior applied by each virtual character in the target camp to a virtual object, and the virtual object being a virtual character in at least one of the target camp or an enemy camp of the game;

determining, according to the behavior information, contribution information achieved by each virtual character in the target camp during the teamfight;

determining, according to the contribution information, a target virtual character and a target virtual reward resource corresponding to the target virtual character from the at least one virtual character comprised in the target camp; and updating attribute information of the target virtual character according to the target virtual reward resource.

14. The non-transitory computer-readable storage medium according to claim 13, wherein the determining, according to the behavior information, contribution information achieved by each virtual character in the target camp during the teamfight comprises:

determining, according to the behavior information, an achievement status of each virtual character in the target camp for a predetermined game objective during the teamfight; and determining the achievement status as the contribution information of each virtual character in the target camp.

15. The non-transitory computer-readable storage medium according to claim 14, wherein the determining, according to the contribution information, a target virtual character and a target virtual reward resource corresponding to the target virtual character from the at least one virtual character comprised in the target camp comprises:

determining, according to the achievement status corresponding to the contribution information of each virtual character in the target camp, a virtual character that achieves at least one game objective and that is in the at least one virtual character comprised in the target camp as the target virtual character;

determining at least one contribution type in a one-to-one correspondence with the at least one game objective;

determining at least one candidate virtual reward resource in a one-to-one correspondence with the at least one contribution type; and determining one virtual reward resource determined from the at least one candidate virtual reward resource as the target virtual reward resource.

16. The non-transitory computer-readable storage medium according to claim 15, wherein the determining one virtual reward resource determined from the at least one candidate virtual reward resource as the target virtual reward resource further comprises:

determining a virtual reward resource with a highest priority in the at least one candidate virtual reward resource as the target virtual reward resource.

17. The non-transitory computer-readable storage medium according to claim 13, wherein the determining, according to the behavior information, contribution information achieved by each virtual character in the target camp during the teamfight comprises:

determining, in a case of determining that the enemy camp comprises a dead virtual character and according to information related to the dead virtual character in the behavior information, the contribution information achieved by each virtual character in the target camp during the teamfight, the enemy camp being a camp having a hostile relationship with the target camp, the dead virtual character being a virtual character that changes from a survival state to a death state during the teamfight, and the contribution information being used for representing a correlation degree between each virtual character in the target camp and the dead virtual character that changes from the survival state to the death state.

* * * * *